(12) United States Patent
Tran

(10) Patent No.: US 6,505,238 B1
(45) Date of Patent: Jan. 7, 2003

(54) METHOD AND SYSTEM FOR IMPLEMENTING UNIVERSAL LOGIN VIA WEB BROWSER

(75) Inventor: Trung Minh Tran, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/377,640

(22) Filed: Aug. 19, 1999

(51) Int. Cl.$^7$ ................................................ G06F 9/00
(52) U.S. Cl. ...................................... 709/208; 709/229
(58) Field of Search .............................. 709/208, 217, 709/219, 229

(56) References Cited

U.S. PATENT DOCUMENTS

| | | | |
|---|---|---|---|
| 5,241,594 A | | 8/1993 | Kung .............................. 380/4 |
| 5,655,077 A | | 8/1997 | Jones et al. ............. 395/187.01 |
| 5,768,504 A | | 6/1998 | Kells et al. ............. 395/187.01 |
| 5,801,689 A | * | 9/1998 | Huntsman ..................... 345/329 |
| 5,802,305 A | * | 9/1998 | McKaughan et al. ........ 709/227 |
| 5,909,545 A | * | 6/1999 | Frese, II et al. ............. 709/208 |
| 6,122,363 A | * | 9/2000 | Friedlander et al. ......... 379/230 |
| 6,138,150 A | * | 10/2000 | Nichols et al. .............. 709/219 |
| 6,205,476 B1 | * | 3/2001 | Hayes, Jr. .................... 709/220 |
| 6,209,036 B1 | * | 3/2001 | Aldred et al. ................ 709/229 |
| 6,286,003 B1 | * | 9/2001 | Muta ............................ 707/10 |

OTHER PUBLICATIONS

Johner et al., Understanding LDAP, 1998, IBM Redbooks, Chapters 1.3–1.4, 2.1–2.3, 4.4.*
Richardson et al., Virtual Network Computing, Jan.–Feb. 1998, IEEE Internet Computing, vol. 2, pp. 33–38.*
Wood et al., Global Teleporting with Java: Toward Ubiquitous Personalized Computing, Feb. 1997, Computer, vol. 30, pp. 53–59.*
Li et al., A Framework for Universal Personal Computing, Sep. 29–Oct. 2, 1996, Universal Personal Communications, 1996. Record., 1996 5$^{th}$ IEEE International Conference on, vol. 2, pp. 769–773.*
Redlich et al., Requirements for Personalized User Environments in Telecommunications, Jun. 3–4, 1996, Services in Distributed and Networked Environments, 1996., Proceedings of Third International Workshop on, pp. 35–42.*
Douglis et al., The Workstation as a Waystation: Integrating Mobility into Computing Environments, Apr. 23, 1992, Workstation Operating Systems, 1992. Proceedings., Third Workshop on, pp. 17–21.*
Yeong et al., Lightweight Directory Access Protocol, Mar. 1995, Network Working Group, Request for Comments 1777, from http://www.cis.ohio–state.edu/cgi–bin/rfc/rfc1777, pp. 2–22.*
Park et al. (Journal of the Korea Information Science Society, vol. 22, No. 3, pp. 393–402, Mar. 1995) (abstract only).
http://www.umich.edu/~dirsvcs/ldap/doc/guides/slapd/1.html.

* cited by examiner

*Primary Examiner*—Dung C. Dinh
*Assistant Examiner*—Bradley Edelman
(74) *Attorney, Agent, or Firm*—David A. Mims, Jr.; Bracewell & Patterson, L.L.P.

(57) ABSTRACT

A method is described for allowing remote login to a user's personal workstation. The workstation is a client terminal connected to a server within a network. The method comprises the steps of searching, from a remote location, for a login web page of the network via a web browser and entering a series of login credential information into a particular login request area on the web page. In response to correctly entering the login credential information into the login request area, the user is provided with a graphical user interface (GUI) of the particular user's network terminal and full access to the personal network information such as software applications stored in the memory of the client terminal. (i.e. simulating the user's client terminal GUI and providing full access to locally stored software and functional elements of the user's client terminal). In a preferred embodiment, the login credential information includes the server site, the user identification, and the user's security password. The search for the particular web page and user's workstation using the login credential information is managed by a directory access protocol.

30 Claims, 6 Drawing Sheets

METHOD AND SYSTEM FOR IMPLEMENTING UNIVERSAL LOGIN VIA WEB BROWSER

BACKGROUND OF THE INVENTION

1. Technical Field

The present invention relates in general to electronic networks and in particular to remote access to electronic networks. Still more particularly, the present invention relates to remote access to client terminals on electronic networks utilizing a web browser application and the Internet.

2. Description of the Related Art

Client/Server software architectures have been in use since the late 1980s throughout industry. These architectures provide a versatile infrastructure that supports shared access to server resources. A client is defined as a requester of services, and a server is defined as the provider of services. A single machine can be both a client and a server depending on the software configuration. A client machine is loaded with client software, while a server machine is loaded with server software. Clients can be either stand-alone computer systems (like personal computers, or PCs) or "dumber" systems adapted for limited use with a network. With computer system clients, the local terminal may also be loaded with a user's individual software applications not shared on the network.

With most client/server architectures, the user system interface is usually located in the user's desktop environment and the applications and/or services are usually stored in a server that services many clients. The database management server provides stored procedures and triggers.

A generalized client-server computing network has several nodes or servers which are interconnected, either directly to each other or indirectly through one of the other servers. Each server is essentially a stand-alone computer system (having one or more processors, memory devices, and communications devices), that has been adapted (programmed) for one primary purpose, that of providing information and/or services to individual users at another set of nodes or workstation clients.

The information provided by a server can be in the form of programs which run locally on a given client terminal, or in the form of data, such as files, that are used by other programs. Users can also communicate with each other in real-time as well as by delayed file delivery, i.e., users with terminals connected to the same server can all communicate with each other without the need for the larger network, and users with terminals at different servers can communicate with each other via the network. The network can be local in nature, or can be further connected to other networks.

The construction of a network is also generally applicable to Wide Area Networks (WAN) including the Internet. The World Wide Web (commonly referred to as "Web") is a graphic, interactive interface for the Internet. The term Internet is utilized interchangeably with Web throughout this specification. Internet services are typically accessed by specifying a unique address, or universal resource locator (URL). The process utilizes Transfer Control Protocol/Internet Protocol (TCP/IP) transactions via telecommunication networks and a modem. The URL allows a web browser to connect and communicate with a HyperText Transfer Protocol (HTTP) server over the Web. The URL has two basic components, the protocol to be used, and the object pathname. For example, the URL "http://www.uspto.gov" (home page for the United States Patent & Trademark Office) specifies a hypertext transfer protocol ("http") and a pathname of the server ("www.uspto.gov"). The server name is associated with a unique numeric value (a TCP/IP address, or "domain").

There is typically a different computer program application (web browser clients, referred to hereinafter as web browser) on a data processing system connected to the web that is utilized to access servers connected to the Web. Today, most networks are connected to the Internet and the servers in the network store web pages that are accessible by clients/machines communicating with the server via the Web. A web page is a graphic display which is usually linked together and may be downloaded to a data processing system utilizing a web browser.

A web browser is a client application which enables a user to view web pages (created with hypertext markup language (HTML)) on the Web, another network, or the user's computer, follow the hyperlinks within them, and transfer files. Most web browsers require a connection which can handle IP packets but will also display graphics that are in a HTML document, play audio and video files, and execute small programs, such as Java applets that can be embedded in the HTML documents. Most web browsers also allow users to send and receive e-mail and to read and respond to newsgroups.

Conventional protocols and services have been established for the Internet which allow the transfer of various types of information, including electronic mail, simple file transfers via FTP (File Transfer Protocol), remote computing via Telnet, "gopher" searching, Usenet newsgroups, and hypertext file delivery and multimedia streaming via the Internet. A given server can be dedicated to performing one of these operations, or running multiple services.

One problem associated with these remote services is that the remote login panels—for telnet, tn, ftp, rlogin, etc.—are not standardized nor universal. Each login panel is configured differently and may require different information to permit access to the remote server. Additional problems include the lack of firewall protection, the unavailability of graphical user interface (GUI) support, and limited accessibility via a visible machine or one allowed to access the server machine.

The Lightweight Directory Access Protocol (LDAP) is a protocol for accessing online directory services. It runs directly over TCP, and can be used to access a stand alone LDAP directory service or to access a directory service that is back-ended by X.500 or DB2, the global directory structure which operates essentially as a web directory.

The IETF (Internet Engineering Task Force) developed the LDAP specification which rapidly became the solution of choice for all types of directory service applications on IP networks. LDAP applications can be loosely grouped into three categories: those that locate network users and resources; those that manage them; and those that authenticate and secure them.

LDAP directories play the role of a network-accessible database, by organizing and indexing information. For example, the address book in most e-mail clients employs LDAP to locate addresses. When a user browses the member directory at a Web site, or a consumer scans the bestseller lists of an online bookstore, they are utilizing the resources of an LDAP.

LDAP directories and operating systems are melding to create intelligent environments that can locate network resources automatically. LDAP also is starting to play a critical role in network management. Without LDAP, corporate networkers have to maintain duplicate user information in dozens of application-specific directories across the network. With LDAP, it's possible to centralize this information in a single directory accessed by all applications.

One of the desired features of networks, whether LAN or Internet based, is the ability to login from a remote location and connecting to the server. Typically servers are accessible via remote login utilities such as file transfer protocol (ftp), telnet, tn, rlogin, etc. utilizing a telephone line, Integrated Services Digital Network (ISDN), or Digital Subscriber Line (DSL). However, these remote login utilities currently only provide limited access (typically to top level network resources such as file transfer or e-mail) to a user's working environment. Those skilled in the art are familiar with the intrinsic limitations of remote login that make only specific top level services available to the remote user. From a remote workstation or PC, current network applications do not allow a user to access and/or make the remote machine act like the user's own working environment. For example, the user may desire to access his personal desktop setting and software (spreadsheets and word processors, etc.) from a remote site. Presently, the user will be unable to gain such wide access with the limited top level access available. With workers in today's work environment constantly on the move, the increasing flexibility and desire to work from home, a demand for full and easy remote access to a user's client terminal (desktop environment) exists.

The present invention appreciates the fact that it would be desirable to provide a method and system for remotely logging on to a user's personal workstation connected to a server of a network. It would further be desirable to remotely login to a network's server via a web browser over the Internet and to provide secure access to a user's particular desktop. It would also be desirable if the login system was uniquely identifiable and supported by a GUI.

SUMMARY OF THE INVENTION

It is therefore one object of the present invention to provide an improved electronic network.

It is another object of the present invention to provide an improved method and system for remote access to electronic networks.

It is yet another object of the present invention to provide an method and system for remote login to a client terminal/workstation connected to an electronic network utilizing a web browser application over the Internet and a modified Directory Access Protocol.

The foregoing objects are achieved as is now described. A method for allowing remote login to a user's personal workstation is described. The work station is a client terminal connected to a server within a network. The method includes the steps of searching, from a remote location, for a login web page of the network via a web browser, and entering a series of login credential information into a particular login request area on the login web page. In response to correctly entering the login credential information, the user is provided with a Graphical User Interface (GUI) representation of the particular user's workstation and full access to the personal network information such as software applications stored in the memory of the client terminal (i.e. simulating the user's network terminal GUI and providing full access to locally stored software and functional elements of the user's work station). In a preferred embodiment, the login credential information includes the server site, the user identification, and the user's security password. The search for the particular web page and workstation using the login credential information is managed by the Lightweight Directory Access Protocol (LDAP).

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 2:
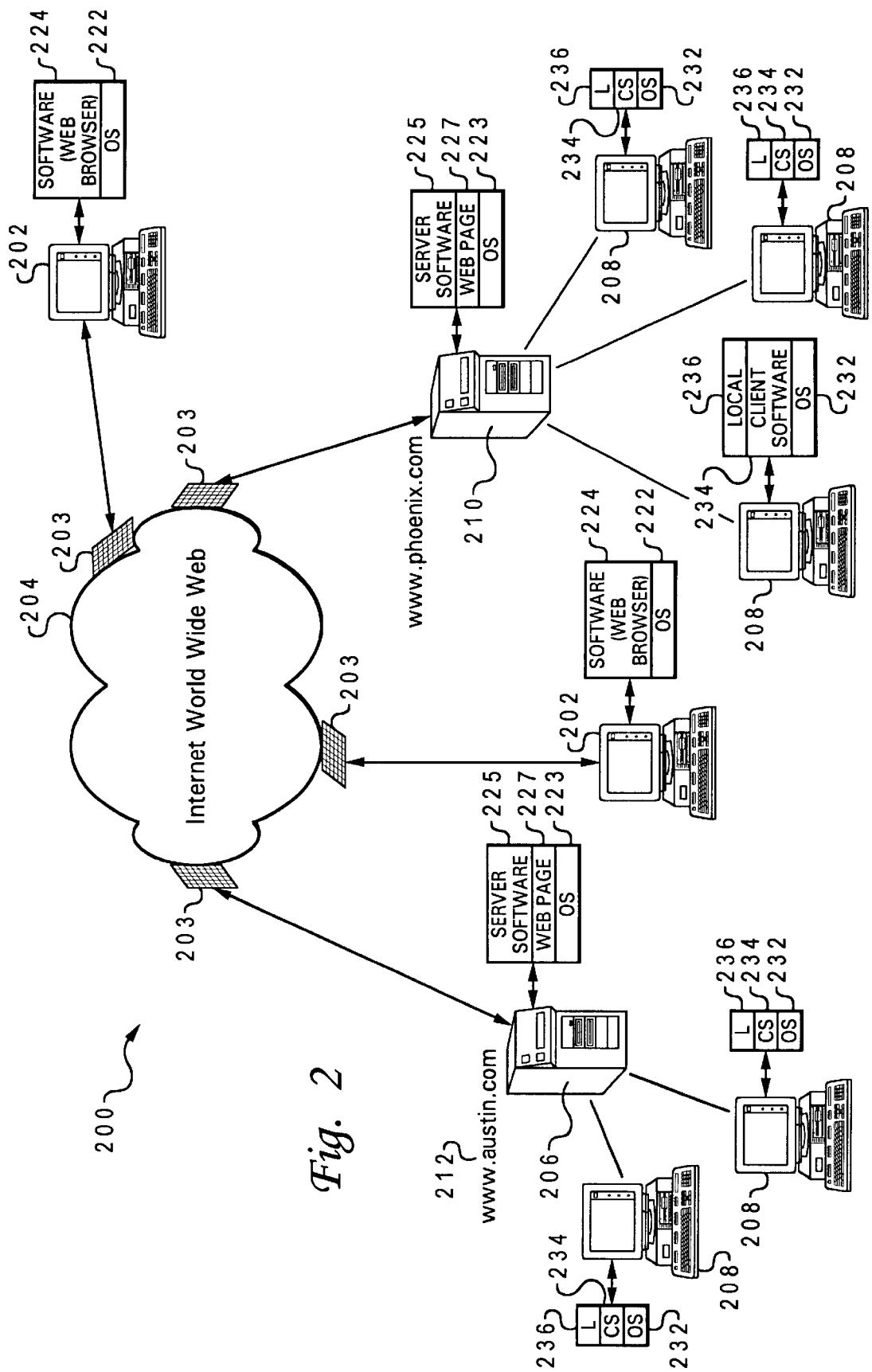
FIG. 2 is a high-level block diagram of a server-client based network connected to the Internet in accordance with a preferred embodiment of the present invention.

The present invention is directed to a method for remote login via the Internet to a user's personal workstation connected to a computer-based electronic network such as the network of FIG. 2. The invention may, however, be implemented in other types of terminals and networks and, while the present invention may be described with reference to the provided Figures, these references should not be construed in a limiting sense. For the purposes of this invention, the terms client terminal and client are utilized interchangeably to refer to both the hardware component which is connected to a network server and the software applications stored in memory and being run on the hardware component. Also, the terms "workstation" and "client terminal" are utilized interchangeably.

Figure 1:
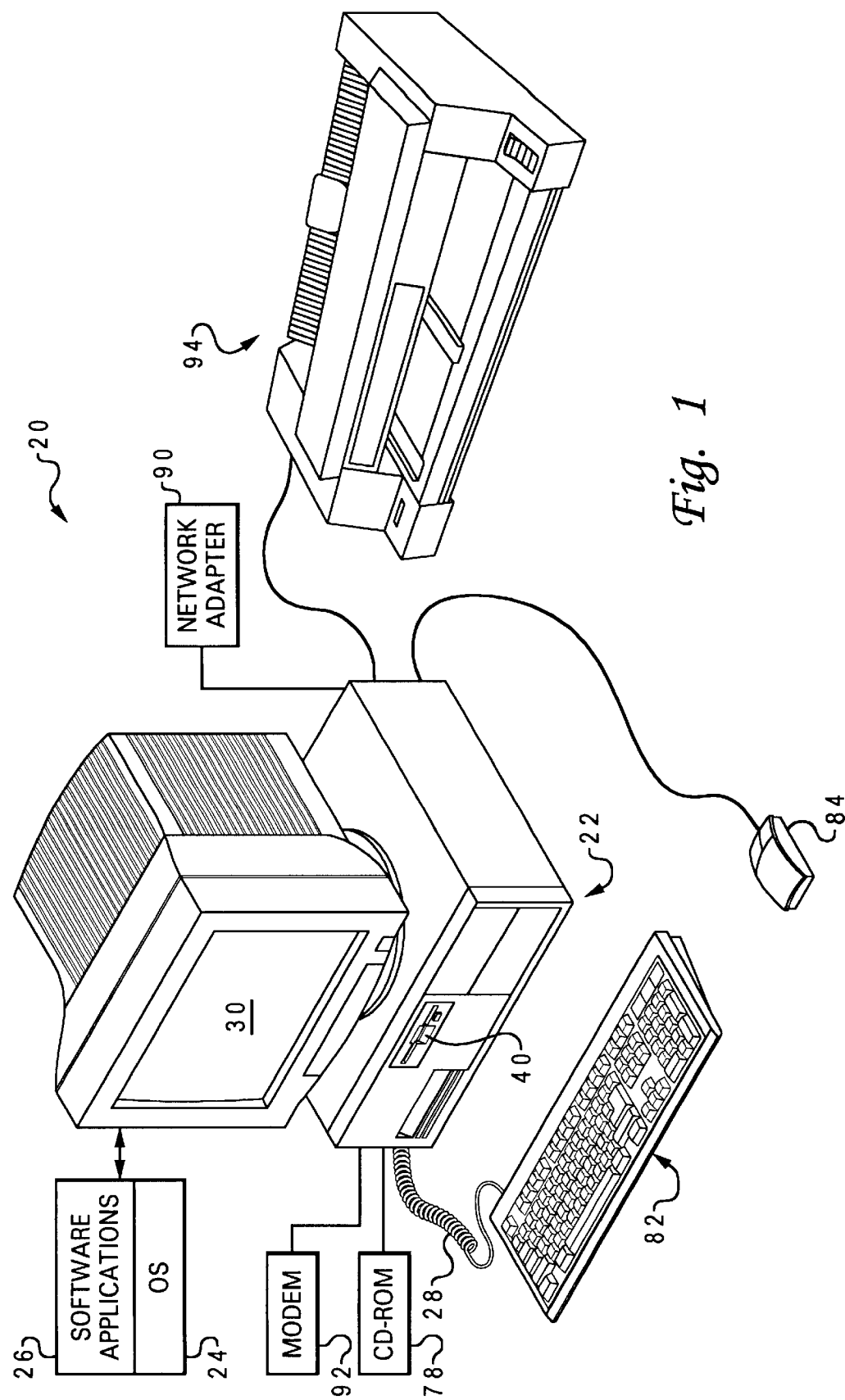
FIG. 1 depicts a data processing system, in which a preferred embodiment of the present invention may be implemented.

With reference now to the figures and in particular with reference to FIG. 1, a data processing system that may be utilized as one of the client terminals or servers on a network, or as a remote login machine is presented. Data processing system 20 comprises a Central Processing Unit (CPU) housed in a casing 22. Casing 22 also holds the various hardware components including disk drives 40, and memory devices (not shown). Stored within memory devices are the operating system (OS) 24 and software applications 26. Several Peripheral input/output devices are connected to the CPU. These input/output devices include keyboard 82, mouse 84, printer 94, CD ROM 78, and display monitor 30. Display monitor 30 provides a graphical user interface (GUI) which allows a user to view and interact with software applications 26 stored in system memory or provided via a network, by displaying icons or other start up mechanisms with which the user may interact. Display monitor 30, controlled by display controller (not shown), is used to display visual output generated by data processing system 20. Such visual output may include text, graphics, animated graphics, and video. Display monitor 30 may be implemented with CRT-based video display, an LCD-based flat panel display, or a gas plasma-based flat-panel display.

Also coupled to CPU are various external devices, including modem 92, and network adapter 90, utilized for connecting data processing system 20 to other systems and/or networks, as is illustrated in FIG. 2. CD rom 78, modem 92, and network adapter 90 are depicted as external components; however those skilled in the arts are familiar with the various structures of data processing system architecture and understand that these components may be housed inside of casing 22.

Modem 92 is a communication device that enables a computer to transmit information over standard telephone lines or wireless connections such as cellular. Modem 92 converts digital computer signals to interlock signals suitable for communications over these telephone media. Modem 92 can be utilized to connect data processing system 20 to an on-line information service or an Internet service provider (ISP). Such ISPs may offer software that can be down loaded into data processing system 20 via modem 92. Modem 92 may also provide a connection to other sources of software, such as a server, an electronic bulletin board (BBS), or the World Wide Web.

Network adapter 90 may be used to connect data processing system 20 to a Local Area Network (LAN) as depicted in FIG. 2. LAN may consist of a single server or a number of servers and provides network clients with a means of communicating and transferring software and information electronically within the network environment. Additionally, LAN may provide distributed processing, which involves several computers in the sharing of workloads or cooperative efforts in performing a task.

Referring now to FIG. 2, a high-level block diagram of a server-client based network connected to the Internet is illustrated in accordance with a preferred embodiment of the present invention. The present invention is concerned with the simulation, on a display monitor of a remotely located data processing system (hereinafter referred to as a search client and/or web browser), of a fully functional GUI of a user's terminal connected to a network environment. System 200, is comprised of a search client 202. Search client 202 consists of hardware and software components. The software components include an operating system (OS) 222 and a web browser application 224, which are typically stored in memory of search client 202. Search client 202 is connected to Internet (Web) 204, via a gateway 203. Internet 204 has a plurality of gateways 203 which provide the access to the Internet services for client terminals 202 and network servers 206 and 210.

Network servers 206 and 210 are connected to client terminals 208 to form a network. Server's are typically data processing systems having a database (not shown), OS 223, and server software 225. Client terminal 208 is also a data processing system and has OS 232 and client software 234 stored in memory. Client terminal 208 also has locally stored software applications 236. Each user is assumed to have configured his workstation in a unique way.

In the preferred embodiment, servers 206 and 210 have a login web page 227 which operates to provide remote login capability to the network. Login web page 227 is also stored in a memory location of server 206 and 210. Login web page 227 is a web page of the corporation/organization and has a specific URL address. The web browser application 224 of the remote search terminal 202 is utilized to conduct a search for the corporation's login web page 227 via the Internet and display the login web page 227 and ultimately the GUI of the user's client terminal 208 in the display monitor of the remote search terminal 202. Server 206 and 210 thus provides Internet access to and from the rest of the network. During implementation of the invention, server 206 and 210 provides access to a particular client terminal 208. Once access is provided, client terminal 208 then operates as a server to the remote search terminal 202.

In this configuration, remote search terminals 208 are either directly connected clients or remote clients. Directly connected clients includes personal computer (PC), another PC server, or a PC/NC workstation connected via LAN or a landline (phone line), or wireless connection, etc. Remote clients may include a home-based network computer, a laptop, or a palmtop. These remote clients can access the former client terminal operating as a server from a remote location via the Internet. In the preferred embodiment, clients terminals 208 and the remote clients do not all have identical software locally installed as each remote client is able to simulate the client terminal 208 and access its software applications.

Remote search terminal preferable refers to a remote terminal which connects to the network via the Internet in order to access a particular client terminal. The remote terminal may be in the same physical location as the server or at any other location throughout the world; however, the preferred embodiment contemplates that remote terminals are generally located far from the network server. Directly connected clients/terminals, connected via landline or otherwise to the server and capable of accessing its login web page, may also be utilized, in one embodiment, to permit universal access through the functionality of the present invention.

Server 206 is shown having URL 212 of www.austin.com. The URL, as discussed previously, is a unique address on the Web assigned to only one web page. Web browser 224 is utilized to access login web pages on servers throughout the Internet. When web browser 224 is seeking the login web page associated with a particular address, for example www.phoenix.com, the web browser accesses the World Wide Web 204, which provides a connection to server 210. The user utilizing web browser 202 is provided with a GUI representation of the login web page 227 stored on the harddrive of server 210 having the associated address www-.phoenix.com. In the preferred embodiment of the invention, the accessing of the desired web site is completed with LDAP.

The present invention combines LDAP technology and a web browser to allow remote access to a client terminal. The invention is implemented at two levels. First, large organizations/corporations such as IBM, University of Texas, or a Government entity structure their computer networks in a hierarchical format utilizing LDAP. Next, their computer networks are made accessible to a remote client via the Internet by storing the necessary software on the network servers and client terminals. The software further permits a client terminal to be simulated on the remote search terminal of a user who has entered the proper credential information.

The current LDAP specification comprises a variety of features and functions for defining or performing directory-related tasks like storage and retrieval. These features and functions have been described and incorporated by the Internet Engineering Task Force (IETF). Those skilled in the art are familiar with LDAP. However, for the purposes of the present invention, a brief description of the protocol as it applies to the invention is provided below.

The LDAP protocol defines how its various models and functions map onto TCP/IP. The LDAP protocol specifies the interaction between clients and servers and determines how LDAP requests and responses are "formed." For example, the LDAP protocol stipulates that each LDAP request is carried in a common message format and that entries contained in response to a search request are transported in separate messages, thus allowing the streaming of large result sets. LDAP allows URLs to be used in directory lookups.

Entries are arranged in a tree structure and divided among servers in a geographical and/or organizational distribution. Entries are named according to their position in this hierarchy by a Distinguished Name (DN). Each component of the DN is called a Relative Distinguished Name (RDN). Alias entries, which point to other entries, are allowed, circumventing the hierarchy. The relationship between entries, attributes, and values are arranged in a tree like structure by LDAP.

Figure 3:
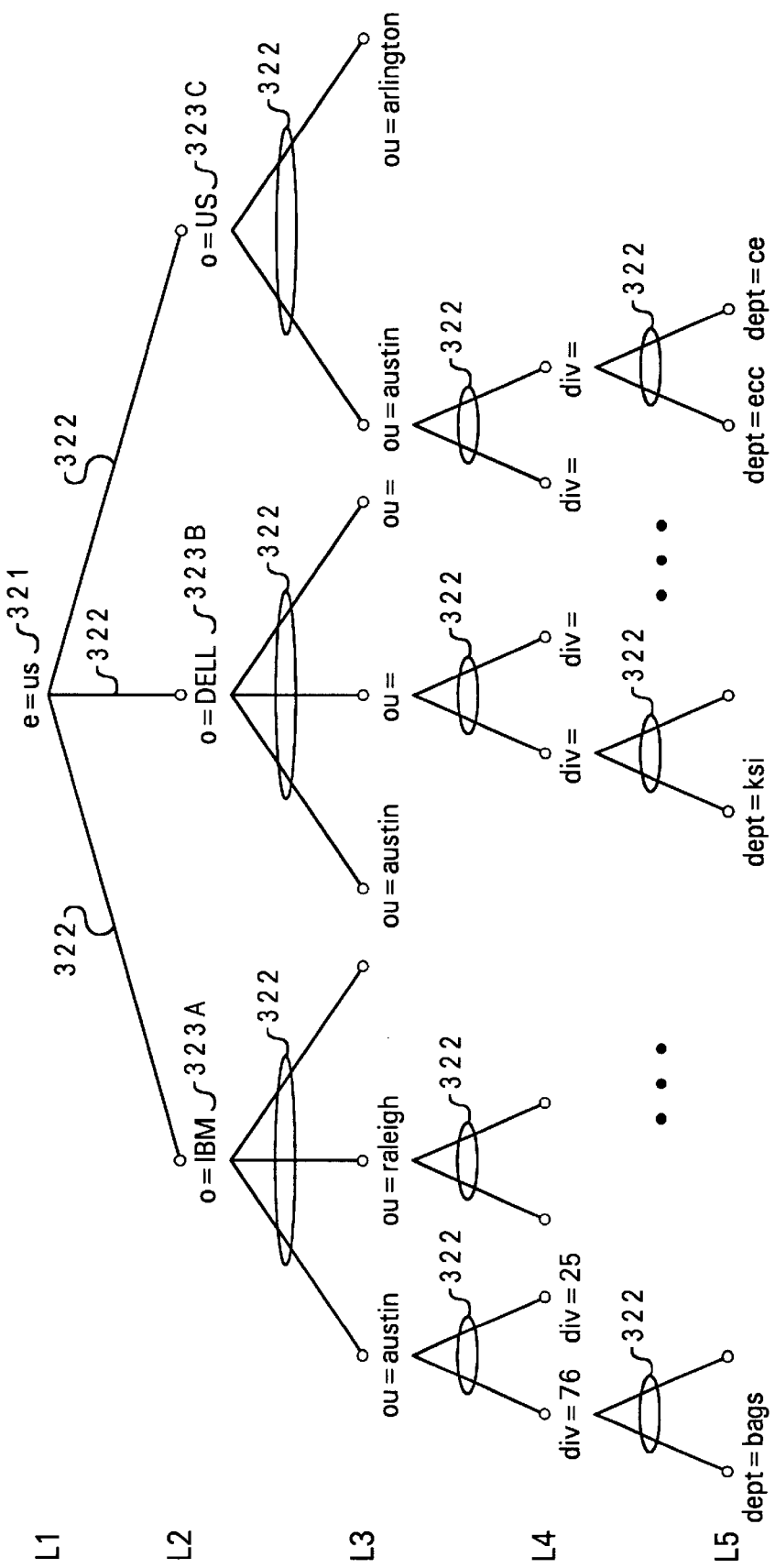
FIG. 3 illustrates an Lightweight Directory Access Protocol (LDAP) directory tree utilized within a preferred embodiment of the present invention.

The structuring of the various groups within LDAP is depicted in FIG. 3. FIG. 3 illustrates various levels of the directory structures. Specifically, 5 levels (L1 to L5) are illustrated. The top level, level one (L1) is the country level, c, illustrated herein as the US 321. Branching from the top level is the second level (L2), where the corporations or organizations are delineated. Branches 322 provide LDAP with a tree-like structure and exist between every level of the structure. For simplicity, only four levels of branches are depicted here. L2 contains the corporate names of IBM 323A, Dell 323B, and UT (University of Texas) 323C, respectively. The remaining lower structures will now be described with specific reference to IBM Corporation. Branching down from L2, is level three (L3), which contains location information (i.e. the various geographical locations of the corporation). In this illustration, L2 contains Austin and Raleigh, representing two IBM site locations. The forth level (L4) contains the division information within the specific location. Finally, L5 contains the department information from within each division. It is understood that each company/corporation is structured in a different manner. The invention adapts its directory structure to reflect the structure/format of the respective corporation, organization, or network environment.

In a preferred embodiment of the invention, LDAP's DN (Distinguish Name) is used to assist an organization (companies, schools, governments, etc . . . ) categorize the structure of its computer network into sub-groups. The sub-groups then use ACL (Access Control List) to authorize their own members. An example of the syntax name for each sub-group is illustrated below:

| | |
|---|---|
| c = US | <--Country name |
| o = IBM | <--Organization |
| ou = Austin | <--IBM Austin site |
| div = NWS | <--Division name |
| dept = LDAP | <--Department |
| OR | |
| c = US | <--Country name |
| o = University of Texas | <--Organization |
| ou = Austin | <--Austin campus |
| div = engineer | <--College of Engineer |
| dept = ece | <--Department of Electrical and Computer Engineering |

Utilizing this syntax, a more specific example of an XYZ corporation can be modeled as follows:

| | |
|---|---|
| 1. o = XYZ, c = US | <-headquarters |
| 2. o = XYZ, ou = Austin, c = US | <-XYZ Austin site |
| 3. o = XYZ, ou = San Jose, c = US | <-XYZ San Jose site |
| 4. o = XYZ, ou = Raleigh, c = US | <-XYZ Raleigh site | where "o" represents the organization name, "ou" represents the organizational unit and "c" represents the country. In this example, XYZ corporation has three locations, Austin, San Jose, and Raleigh. Knowledge of the locations desired enables LDAP to more easily locate the desired network site. The invention contemplates structuring every organization in the world in a similar manner. Organizations which are networked will then allow LDAP to conduct hierarchical searches for a particular location and user client terminal.

In a preferred embodiment, the Web Browser program or Internet application includes a new button in the horizontal bar menu to allow the user to access the organization's network environment and login to his personal client terminal.

From the user's perspective, the invention operates with three main steps:

(1.) Using a Web Browser, the user enters the organization's URL. This opens the login web page of the organization stored in the memory of the network server;

(2.) From this web page, the user is permitted to login to his workstation by entering the proper credential information including his userid and password; and (3.) Once the user provides the correct credential information, the network applications and personal applications, data, email, etc. are simulated on and fully accessible from the remote search terminal as if the user were using his own workstation.

In the preferred embodiment, the credential data is kept in the local server where the user's network is located and not in the central database of the organization in order to avoid excess overhead of the organizations central server. The universal login functionality of the invention requires that the data processing system from which the remote login to the workstation occurs must itself have access to and be "visible" to the world over the Internet.

In a preferred embodiment, in order to universally login to a workstation, the web browser application displays a dialog box having a login area or panel which allows a user to enter the following information when he clicks on the login button:

1. The URL of the server work domain. For example, http://www.ibm.com or http://www.utexas.edu, etc;

2. The Server's Distinguish Name (DN). For example, c=US, o=IBM, ou=Austin, div=NWS, group=LDAP;

3. The user login name. For example, ttran; and

4. The user password. For example, guy26.

The dialog box may be a child window which operates as a universal login tool. It permits a standardized remote login function to be implemented regardless of the type of network or its location. Once the universal login panel is filled in, the web browser or Internet application performs the following steps:

1. Use the URL to access and open the web page;
2. Use the DN to contact the server;
3. Use the username and user password to login by using Public Key Technology. Those skilled in the art are familiar with Public Key Technology and its use in logging on a network site.

Figure 5:
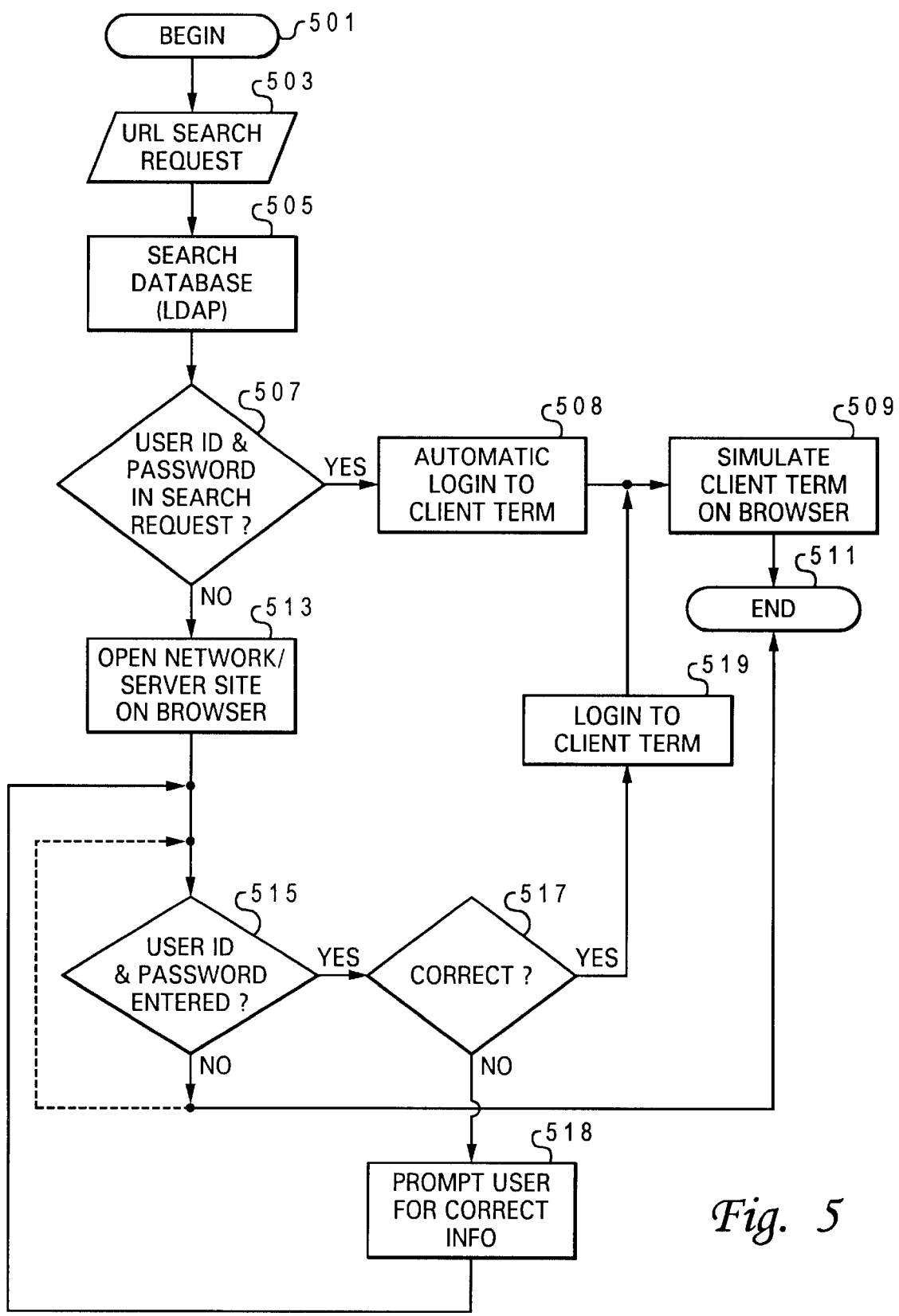
FIG. 5 is a high level logical flow chart depicting the process of enabling a client terminal simulation on a web page in accordance with a preferred implementation of the present invention.

FIG. 5 depicts a flowchart of a process of remote login to a client terminal on a network. The process begins (step 501) when the user enters a search request on the web browser (step 503). LDAP initiates the search of its database to find the web page of the network server (step 505). A check is made to determine if the search request included the userid and password (step 507). If the search request included the userid and password and LDAP is successful in locating the web page, LDAP initiates an automatic login to the user's client terminal (step 508). The client terminal is then simulated on the web browser (step 509). Then the process ends (step 511). If however, the search request was for the network's general web site (i.e. without the userid and password), then LDAP opens the network web page (step 513). From here, the user may enter the userid and password in the client login area dialog box 515, then click on the submit button to initiate login. A check is made to determine if the userid and password are correct and a match exists (step 517). If a match exists, then the user's client terminal is logged into (step 519) and is simulated on the web browser (step 509). The process then ends (step 511). If, however, the entered information is incorrect, then the user is prompted to enter the correct information (step 518). Various other process steps are possible in the implementation of the invention, for instance, the distinguishing name and other location information may be required. Also, various steps may be subdivided into sub-steps. Step 517 may be subdivided into series of input and check steps as LDAP searches the hierarchy of the database. Those skilled in the art will appreciate that various other embodiments are possible and fall within the scope of the invention.

In one embodiment, the DN may be optionally omitted from the list of search parameters. However, with this embodiment, the search is conducted sequentially. In the illustrative example, for IBM organization, LDAP begins the search for the userid at the first IBM location in the database (Austin) and continues sequentially through the different IBM locations until the last IBM location (Raleigh) is checked or the userid is found. If one of the locations is unavailable (for example, the network server is down), the process continues to the next location after a timeout condition is reached. For illustrative purposes, this timeout condition may occur after 5 seconds or after 5 tries to access the server or network at a location is unsuccessful. The timeout condition is used to prevent the search from stalling at an unaccessible location. A check is made for the occurrence of a timeout so that the process continues smoothly. The access control list (ACL) is set and used to control and set limits on the remote access to a network. However, once the user is authenticated, he is able to connect to and simulate his workstation and complete his task.

Figure 4A:
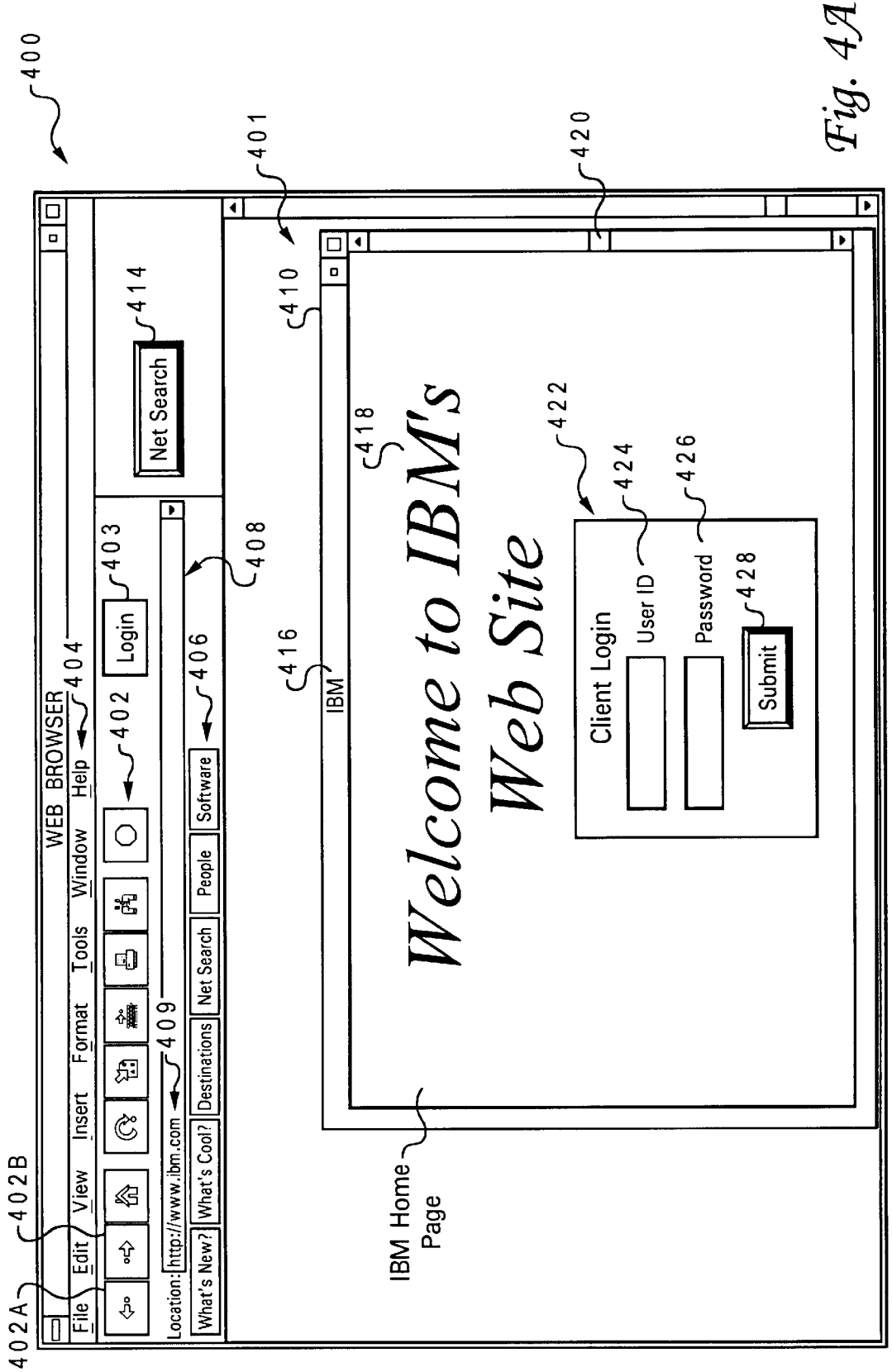
FIG. 4A illustrates a high level block diagram of a standardized login web page of a web browser in accordance with a preferred implementation of the present invention.

Referring now to FIG. 4A, a web browser in accordance with a preferred implementation of the present invention is depicted. Web browser 400 is a graphical user interface (GUI) on a display monitor of a data processing system. Web browser 400 includes a number of selection buttons 402 such as next and previous buttons 402A and 402B that may be used to switch between web pages that have been retrieved. Web browser 400 also includes a number of menu selection items 404, and alternate selection buttons 406. A new selection button, LOGIN button 403, is added to browser window 400 in the preferred embodiment. LOGIN button 403 permits a user to open a login GUI utilized to access remote network servers, as described further below. Browser window 400 also has a search parameter field 408 for entering the URL 409 of the desired web pages on the Internet. In the illustrated embodiment, the URL for IBM, "www.ibm.com" is entered. Next to search parameter field 408 is a net search button 414, which when selected (via depressing a mouse button), sends the URL 409 to be searched over the Internet. Upon selection of URL 409 by selecting net search button 414, a web page 410 of the desired site (IBM) is downloaded and displayed within display area 401 of web browser 400. In the preferred embodiment, this web page 410 (also referred to as the network login page) displays an identifier 416 at the top of the page and other graphical or textual information 418 within the page. The network login page 410 may also have one or more scroll bars 420 for scrolling through its contents.

To activate a GUI which is utilized solely for remote login to secured network locations, LOGIN button 403 is added as an icon to selection buttons 402 of the Web Browser 400. LOGIN button 403 allows a user to bring up a child window GUI (or dialog box) which is utilized to log into the network server. This combination of a web browser with a special login GUI activated by a LOGIN button allows a user to log into his workstation connected to the network server in one of several ways including:

(1) clicking on LOGIN button—a dialog box having a login request area which prompts the user to enter the organization's URL, location (server's DN), userid, and password are displayed;

(2) entering the URL and credential information directly at the search parameter field of the Web browser (for example; https://www.ibm.com/login?userid=xxxx&passwd=yyyy);

(3) entering the URL of the web page of the network server without the login information at the search parameter field—the login request area with a prompt for the location (server's DN), userid, and password are displayed; and (4) entering the URL with the userid at the search parameter field of the Web browser: (for example, https://www.ibm.com/login?userid=xxxx)—the login request area prompts for the password to be entered.

In one preferred embodiment, as illustrated above, a user specifies to the web browser that he is entering the URL of a secured site with a URL beginning with "https." Unlike the traditional search locator protocol, "http," https allows a user to open the secured site from the web browser once the correct credential information is included. In one embodiment, the current protocol is extended to incorporate this "secured site" feature; however, other embodiments of the invention permit accessing the secured site via the traditional protocol.

Returning to FIG. 4A, dialog box (network login page) 410 includes a remote client login request area 422, which includes locations for entering userid 424 and user password 426. This configuration occurs as a result of the user selecting the LOGIN button 403 as taught by number 3 above. The remote client login area 422 is utilized for login on the network server and accessing the user's workstation. Once a user enters the required parameters, he selects the submit button 428 which sends the login request to the network server. The user's workstation is simulated on the remote GUI within the web page 410. LDAP operates in the background to provide the search facility and connection to the correct site. Additional login parameters may be required to specify the location and identity of the particular client workstation or to trigger a wake-on-LAN signal to boot up the client terminal.

In another preferred embodiment, a user strings together his userid and password along with the URL 409 information in the location box 408. For example:

https://www.ibm.com/ou=austin/div=NWS/gr=LDAP/id=ttran/pswd=guy26; or https://o=ibm/ou=austin/div=NWS/gr=LDAP/id=ttran/pswd=guy26.

Selecting the net search button 414 then automatically simulates the user's client terminal. If the user chooses to omit the password from the URL string, a request area is displayed and prompts the user to enter the password and the user may enter the password without it being echoed.

Figure 4B:
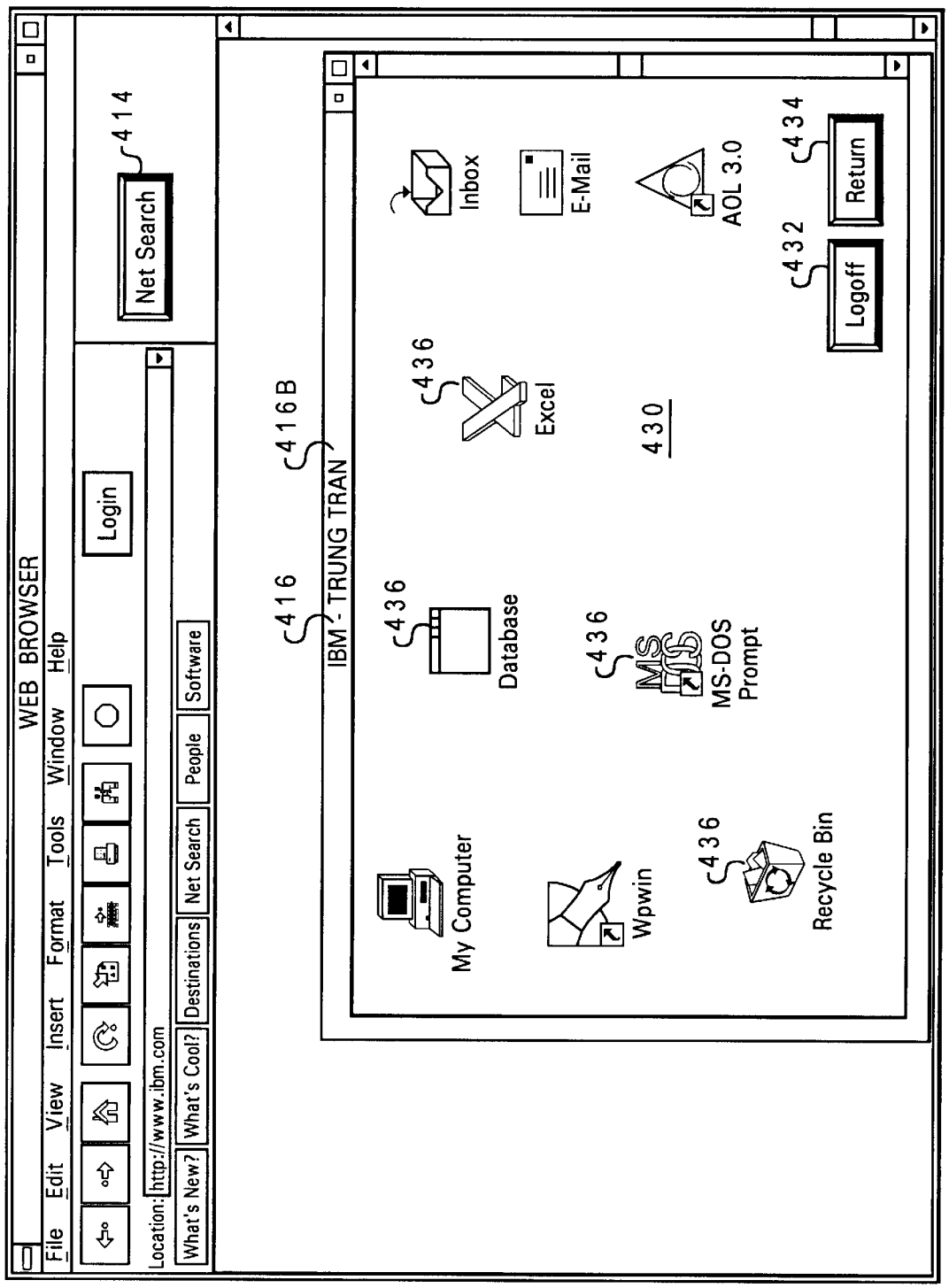
FIG. 4B is the web browser of FIG. 4A simulating a client terminal Graphical User Interface (GUI) in accordance with a preferred implementation of the present invention.

FIG. 4B depicts a simulated network terminal 430 within the web browser of FIG. 4A. Simulated network terminal 430 has a heading 416 which includes the name or identification of the user 416B and includes the various software application icons 436 on the user's client terminal connected to the network. Depicted here are icons 436 for word processing, email, printer selection, etc. In the preferred embodiment, when the user selects one of these icons (for example, the Wordperfect™ (WP) icon), the corresponding WP word processing software, which is resident on his client terminal, is activated. The user is then able to complete word processing functions such as opening a document saved on the hard drive of his client terminal, editing or creating a document, saving a document to the hard drive and printing the document on the network printer (e.g. the printer connected to his client terminal via the network.) When the user is finished, he may close the simulated network terminal by clicking a LOGOFF button 432 or RETURN button 434 which returns him to the remote login web page or web browser 400 of FIG. 4A.

Implementation of the invention requires some additional security considerations since the user access is not in a secured environment. Various security measure may be included in the remote login functionality including:

(1.) automatic logoff after a period of non-use;

(2.) periodic prompting for user password;

(3.) security password access to network databases or secured files or applications, etc.

(4.) sensitive information should not be transferred through the wire.

These security measures may be triggered only with a remote login, necessitating a logic which recognizes a remote login and triggers the measures. The security measures are outside the scope of the invention and those skilled in the art are familiar with the various methods which may be utilized to implement the desired security.

In a preferred embodiment, the Basic Input/Output System (BIOS) which controls basic computer functions includes a remote wake-up functionality such as Wake on LAN. Wake on LAN provides a soft boot functionality. Those skilled in the art are familiar with these remote wake-up capabilities of a networked computer. This enables a server to turn on a client terminal when the server is provided with the activation signal such as a user credential or wake-up code. This functionality may also be utilized to provide security to a client terminal as is discussed above. A remote user enters the particular code to activate the wake-up functionality and cause the user's client terminal to be turned on.

This invention improves the usability and flexibility of the Internet and describes a new and efficient method to allow end-users to universally login to their workstation or work domain from anywhere in the world. One other application of this invention is in allowing users to access ATMs or banks from anywhere in the world. This invention may also use Smart Card Technology where the sub-group's DN name is stored on the card so that the user does not need to enter the login information. However, in this embodiment, a PIN is required to identify his/her authority for using the card.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally, regardless of the particular type of signal bearing media utilized to actually carry out the distribution. Examples of computer readable media include: nonvolatile, hard-coded type media such as Read Only Memories (ROMs) or Erasable, Electrically Programmable Read Only Memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention. Particularly, while the invention has been described with reference to a windows-based (GUI) computer system, it is understood that the functional aspects of the invention are fully applicable to a text-based (e.g. DOS or UNIX) system.

What is claimed is:

1. A method for remote access to a user's client terminal environment on a network from a remote data processing system, said method comprising the steps of:

organizing a network into a directory tree hierarchical structure utilizing a directory access protocol, wherein said hierarchical structure comprises a lower level having at least one client terminal and associated client terminal environment with localized software applications, wherein said organizing step utilizes a Lightweight Directory Access Protocol (LDAP) and includes creating a hierarchical address structure differentiated by one or more levels of addresses from among organization name, geographic location, department, and individual client terminal having a user identification (userid) and user password;

opening, in response to a remote user input from a web browser, a particular level of said hierarchical structure of said network corresponding to an amount of address and credential information entered by said remote user input, wherein said credential information includes a user identification (userid) and user password;

checking said userid and password against a list of userids located within said directory tree hierarchical structure for a match of said credential information, wherein said check is completed on a particular server when sufficient credential information is provided by said user to identify with which server within the hierarchy said userid is affiliated;

simulating said user client terminal environment only when sad used and password matches those found in said directory tree hierarchical structure; and providing said remote user with access to said user's client terminal environment in response to an input by said remote user of a lower level credential information on said web browser, wherein said lower level credential information provides authorized access to said client terminal environment of a particular user via said directory access protocol.

2. The method of claim 1, wherein said open step includes the steps of:

detecting a user's input of a LOGIN request on said web browser;

opening, in response to said detecting step, a LOGIN GUI to enable said user to enter specific login information;

searching an Internet for a network web page having a specific address utilizing said directory access protocol when said specific login information is entered, wherein said search is directed to a particular server based on particular address information entered by said user; and opening said network web page on said web browser when said network web page is found.

3. The method of claim 2, wherein said detecting step includes the step of creating a LOGIN button on said web browser, wherein said LOGIN button opens a LOGIN dialog box in response to a selection of said LOGIN button by a user.

4. The method of claim 2, wherein said first opening step includes the steps of:

prompting said user to enter credential information not previously entered;

when said user has entered credential information, opening a web page corresponding to a level of credential information entered; and providing a portion of a LOGIN dialog box for entry of any credential information not yet entered that is required to access said client terminal environment.

5. The method of claim 2, wherein:

said searching step further including the steps of searching through said directory tree hierarchical structure for a match of said credential information; and said opening step includes the step of opening said client terminal environment on said web browser when a match of said credential information is found.

6. The method of claim 1, wherein said checking step is monitored by a timeout condition, and further comprising the steps of:

terminating a search on a particular server of an organization if said credential information is not matched within a predetermined time to a credential stored on said particular server; and conducting said search on a next server within said organization.

7. The method of claim 1, wherein said checking step further includes the step of prompting the user of said web browser to enter the correct credential information when a match of said credential information is not found in said list of userids.

8. The method of claim 1, wherein said simulating step further includes the steps of:

displaying a user's network terminal GUI on said web browser; and allowing said user to manipulate, via said simulated client GUI, any software applications and databases accessible in said user's client terminal environment.

9. The method of claim 8, wherein, in response to a determination that said access is a remote access, said simulating step further comprises the step of prompting said user for additional security information prior to simulating said client terminal.

10. The method of claim 9, further comprising the step of sending a wake-on-LAN to power-up said client terminal when said client terminal is in an off state.

11. A system for remote access to a users client terminal environment on a network connected to the Internet, said system comprising:

means for organizing a network into a directory tree hierarchical structure utilizing Lightweight Directory Access Protocol (LDAP), wherein said hierarchical structure comprises a lower level having at least one client terminal and associated client terminal environment with localized software applications, wherein further said organizing means includes means for creating a hierarchical address structure differentiated by one or more levels of addresses from among organization name, geographic location, department, and individual client terminal having a user identification and user password;

means for opening, in response to a remote user input via a web browser and said Internet, a particular level web page stored on a server of said network within said hierarchical structure, corresponding to an amount of address and credential information initially entered by said remote user input, wherein said credential information includes a user identification (userid) and user password;

means for checking said userid and password against a list located within said directory tree hierarchical structure for a match of said credential information, wherein said check is completed on a particular server when sufficient credential information is provided by said user to identify with which server within the hierarchy said userid is affiliated;

means for simulating said user client terminal environment only when said userid and password matches those found in said directory tree hierarchical structure; and means for providing said remote user with access to said user's client terminal environment in response to an input by said remote user of a lower level credential information on said web browser, wherein said lower level credential information provides access to said client terminal environment of a particular user via LDAP.

12. The system of claim 11, wherein said opening means includes:

means for checking said web browser for an input of a network home page address;

means for searching said Internet for said network home page address utilizing said directory access protocol when an input is detected, wherein said search is directed to a particular server based on particular address information entered by said user; and means for opening said network web page on said web browser when said web page is found.

13. The system of claim 12, wherein said detecting means includes means for creating a LOGIN button on said web browser, wherein said LOGIN button opens a LOGIN GUI in response to a selection of said LOGIN button by a user.

14. The system of claim 12, wherein said network address also includes credential information, said opening means further including:

means, for when said user has entered credential information, for opening a web page corresponding to a level of credential information entered; and means for providing a portion of a LOGIN GUI for entry of any credential information not yet entered that is required to access said client terminal environment.

15. The system of claim 12, wherein said network address also includes credential information, said searching means further including:

means for searching through said directory tree hierarchical structure for a match of said credential information;

means for opening said client terminal environment on said web browser when a match of said credential information is found.

16. The system of claim 11, wherein said checking means further includes means for prompting the user of said web browser to enter the correct credential information when a match of said credential information is not found in said directory tree hierarchical structure.

17. The system of claim 11, said simulating means includes:

means for displaying a user's network terminal GUI on said web browser; and means for allowing said user to manipulate via said simulated client GUI any software applications stored locally and on the network server and databases and accessible in said user's client terminal environment.

18. The system of claim 17, wherein, in response to a determination that said access is a remote access, said simulating means further comprises means for prompting said user for additional security information prior to simulating said client terminal.

19. The system of claim 18, further comprising means for sending a wake-on-LAN to power-up said client terminal environment when said client terminal is in an off state.

20. The system of claim 11, wherein said checking means is monitored by a timeout condition, and further comprising:

means for terminating a search on a particular server of an organization if said credential information is not matched within a predetermined time to a credential stored on said particular server; and means for conducting said search on a next server within said organization.

21. A computer program product for implementing remote access to a user's client terminal environment on a network from a remote data processing system, said program product comprising:

a computer readable medium; and program instructions on said computer readable medium for:

organizing a network into a directory tree hierarchical structure utilizing a directory access protocol, wherein said hierarchical structure comprises a lower level having at least one client terminal and associated client terminal environment with localized software applications, wherein further said program instructions for said organizing step utilizes a Lightweight Directory Access Protocol (LDAP) and includes program instructions for creating a hierarchical address structure differentiated by one or more levels of addresses from among organization name, geographic location, department, and individual client terminal having a user identification (userid) and user password;

opening, in response to a remote user input from a web browser, a particular level of said hierarchical structure of said network corresponding to an amount of address and credential information entered by said remote user input, wherein said credential information includes a user identification (userid) and user password;

checking said userid and password against a list of userids located within said directory tree hierarchical structure for a match of sad credential information, wherein said check is completed on a particular server when sufficient credential information is provided by said user to identify with which server within the hierarchy said userid is affiliated;

simulating said user client terminal environment only when said userid and password matches those found in said directory tree hierarchical structure; and providing said remote user with access to said user's client terminal environment in response to an input by said remote user of a lower level credential information on said web browser, wherein said lower level credential information provides authorized access to said client terminal environment of a particular user via said directory access protocol.

22. The computer program product of claim 21, wherein said program instructions for said opening step includes program instructions for:

detecting a user's input of a LOGIN request on said web browser;

opening, in response to said detecting step, a LOGIN GUI to enable said user to enter specific login information;

searching an Internet for a network web page having a specific address utilizing said directory access protocol when said specific login information is entered, wherein said search is directed to a particular server based on particular address information entered by said user; and opening said network web page on said web browser when said network web page is found.

23. The computer program product of claim 22, wherein said program instructions for said detecting step includes program instructions for creating a LOGIN button on said web browser, wherein said LOGIN button opens a LOGIN dialog box in response to a selection of said LOGIN button by a user.

24. The computer program product of claim 22, wherein said program instructions for said first opening step includes instruction for:

prompting said user to enter credential information not previously entered;

when said user has entered credential information, opening a web page corresponding to a level of credential information entered; and providing a portion of a LOGIN dialog box for entry of any credential information not yet entered that is required to access said client terminal environment.

25. The computer program product of claim 22, wherein:

said program instructions for said searching step further including program instructions for searching through said directory tree hierarchical structure for a match of said credential information; and said program instructions for said opening step includes program instructions for opening said client terminal environment on said web browser when a match of said credential information is found.

26. The computer program product of claim 21, wherein said program instructions for said checking step is monitored by a timeout condition, and further comprising program instructions for:

terminating a search on a particular server of an organization if said credential information is not matched within a predetermined time to a credential stored on said particular server; and conducting said search on a next server within said organization.

27. The computer program product of claim 21, wherein said program instructions for said checking step further includes program instructions for prompting the user of said web browser to enter the correct credential information when a match of said credential information is not found in said list of userids.

28. The computer program product of claim 21, wherein said program instructions for said simulating step further includes program instructions for:

displaying a user's network terminal GUI on said web browser; and allowing said user to manipulate, via said simulated client GUI, any software applications and databases accessible in said user's client terminal environment.

29. The computer program product of claim 28, wherein said program instructions for said simulating step further comprises program instructions for prompting said user for additional security information prior to simulating said client terminal, in response to a determination that said access is a remote access.

30. The computer program product of claim 28, further comprising program instructions for sending a wake-on-LAN to power-up said client terminal when said client terminal is in an off state.

* * * * *

UNITED STATES PATENT AND TRADEMARK OFFICE
CERTIFICATE OF CORRECTION

PATENT NO.    : 6,505,238 B1                                                        Page 1 of 1
DATED         : January 7, 2003
INVENTOR(S)   : Trung Minh Tran It is certified that error appears in the above-identified patent and that said Letters Patent is hereby corrected as shown below:

<u>Column 12,</u>
Line 66, delete "sad used" and insert -- said userid --.

Signed and Sealed this

Seventeenth Day of February, 2004

JON W. DUDAS
*Acting Director of the United States Patent and Trademark Office*